United States Patent [19]
Whittaker et al.

[11] Patent Number: 6,130,893
[45] Date of Patent: Oct. 10, 2000

[54] METHOD AND APPARATUS FOR MULTIPLEXING TELEPHONE LINES OVER A COMMON ACCESS NETWORK

[75] Inventors: Richard Jonathan Whittaker; Jim Orlando, both of Ottawa, Canada

[73] Assignee: Nortel Networks Corporation, Montreal, Canada

[21] Appl. No.: 08/947,855

[22] Filed: Oct. 9, 1997

[51] Int. Cl.[7] .......................... H04L 12/28; H04M 11/00
[52] U.S. Cl. ........................ 370/420; 379/93.01
[58] Field of Search ................... 370/264, 293, 370/420, 463, 465, 522, 524, 419; 379/2, 12, 26, 32, 83.06, 399, 27, 29, 201, 207, 93.07, 93.01, 379, 352

[56] References Cited

U.S. PATENT DOCUMENTS

| | | | |
|---|---|---|---|
| 5,216,704 | 6/1993 | Willaim et al. | 370/216 |
| 5,305,312 | 4/1994 | Fornek et al. | 370/463 |
| 5,341,418 | 8/1994 | Yoshida | 370/465 |
| 5,446,730 | 8/1995 | Lee et al. | 370/351 |
| 5,812,786 | 9/1998 | Seazholtz et al. | 395/200.81 |
| 5,815,505 | 9/1998 | Mills | 370/522 |
| 5,848,150 | 12/1998 | Bingel | 379/399 |
| 5,859,895 | 1/1999 | Pomp et al. | 379/29 |
| 5,881,131 | 3/1999 | Farris et al. | 379/27 |
| 5,889,856 | 3/1999 | O'Toole et al. | 379/399 |

FOREIGN PATENT DOCUMENTS 0 773 696 A2   5/1997   European Pat. Off.

*Primary Examiner*—Chau Nguyen
*Assistant Examiner*—Chiho Andrew Lee

[57] ABSTRACT

The present invention enables multiple analog telephones to communicate over a two-wire line via the Asymmetric Digital Subscriber Line (ADSL) standard. The analog signal from a standard analog telephone appliance is converted in a terminal adapter associated with the telephone to digital data packets and transmitted over the telephone lines to a central office (CO) using the ADSL standard. Plain Old Telephone System (POTS) frequencies are separated from digital data frequencies by a filter and passed to each terminal adapter on a separate line. On a power-off condition, the terminal adapter connects the telephone to this line. The present invention enables the user to add additional lines without additional wiring into the premises.

12 Claims, 3 Drawing Sheets

METHOD AND APPARATUS FOR MULTIPLEXING TELEPHONE LINES OVER A COMMON ACCESS NETWORK

FIELD OF THE INVENTION

This invention relates generally to telephone and audio transport and telephone subscriber services over a common access network.

BACKGROUND OF THE INVENTION

It is a well-known phenomenon that the use of telephone services by users, especially those with home-based businesses, has increased dramatically in the recent past.

Typically, when a user requires additional telephone lines, the local telephone company must physically install more telephone wires to the user's premises. As the demand for additional lines in an area increases, the telephone company may be required to dig up the ground to install more telephone cables. This is an expensive and time-consuming process, both for the user and the telephone company.

An object of the present invention is to overcome the difficulties in providing more phone lines to a premises without requiring any additional wiring to the premises.

SUMMARY OF THE INVENTION

According to the present invention, there is provided a method for voice multiplexing a two wire telephone line, comprising: sending packetised data to a two wire telephone line, with packets representing a plurality of voice channels; for each packet of packetised data, determining a destination analog telephone from amongst a plurality of analog telephone appliances on said two wire telephone line based on address information of said each packet; and converting data to an analog signal and passing said analog signal to said destination analog telephone.

Another aspect of the invention is A method for voice multiplexing a two wire telephone line, comprising: sending a first data packet to a two wire telephone line addressed to a first analog telephone appliance on the two wire line; converting data of the first data packet to an analog signal and passing the analog signal to the first analog telephone appliance; sending a second data packet to the two wire telephone line addressed to a second analog telephone appliance on the two wire line; and converting data of the second data packet to an analog signal and passing the analog signal to the second analog telephone appliance.

Another aspect of the invention is an apparatus for voice multiplexing a two wire telephone line, comprising: a supply powered decoder and digital to analog converter for connection between a non-POTS line and a POTS port for connection to an analog telephone appliance; and a switch for connection between the POTS line to the POTS port on a supply power off condition.

Another aspect of the invention is a method for adding a telephone line to an existing premise using a digital transmission medium and an analog telephone handset is disclosed. The method comprises, at a terminal adapter, at the premise and upon connection to the digital transmission medium, transmitting a digital request to a central office with an address of the terminal adapter. The terminal adapter receives, in response to the digital request transmitted to The central office, an acknowledgement message which confirms that a new telephone line has been provisioned to the existing premise, without the installation of new cabling. The terminal adapter then receives digital signals transmitted by the central office. A determination is made by the terminal adapter as to whether the digital signals are destined for the terminal adapter. If digital signals are destined for the terminal adapter, then the terminal adapter translates the digital signals to an analog signal which is transmitted to the telephone handset Another aspect of the invention is a terminal adapter for connecting an analog telephone handset to a digital transmission medium which is adapted to create a new telephone line on demand. The terminal adapter comprises: a first input/output port in communication with the digital transmission medium; and a second input/output port in communication with the telephone handset. The terminal adapter also comprises a control means in communication with both of the input/output ports. The control means of the terminal adapter is adapted to transmit to a central office, over the first input/output port, a request for a new telephone line. The control means of the terminal adapted is also adapter to receive a message from die central office in response to the request sent by the control means of the terminal adapter. The control means of the terminal adapter is adapted to receive, at the first input/output port, and identify digital signals transmitted on the digital transmission medium which are destined for the second input/output port. A translator, which is in communication with the control means and the second input/output port, is adapted to convert the digital signals identified by the control means to analog signals and transmit those analog signals to the telephone handset via the second input/output port.

The first input/output port of the terminal adapter may also be in communication with an analog transmission medium. In this instance the terminal adapter further comprises a switch which is adapted to select and receive transmissions from one of the digital and analog transmission media. The terminal adapter may be adapter to operate so that the switch selects the analog transmission medium when the digital transmission medium has failed.

BRIEF DESCRIPTION OF THE DRAWINGS

The present invention will be further understood from the following description with reference to the drawings in which.

DETAILED DESCRIPTION OF THE PREFERRED EMBODIMENTS

The subject invention makes use of the ADSL (Asymmetric Digital Subscriber Lines) standard which was developed in about 1991 in response to the demand for quicker Internet service and to facilitate video applications. The ADSL standard calls for sending data over a twisted-pair (i.e., a two wire telephone line) in the frequency spectrum from 4 kHz to 2.2 MHz, leaving undisturbed the 0 kHz to 4 kHz frequency range for plain old telephone service (POTS). A line operating under the ADSL standard consists of a downstream channel (into the user's premises) of 2 to 8 Mbps, an upstream channel of 0.6 to 2 Mbps and the 64 kbps POTS channel. The upstream and downstream channel bandwidths are dependent upon the distance from the Central Office (CO). The ADSL standard is a broadband access service designed to be used in conjunction with any type of packet-based transmission protocol such as Asynchronous Transfer Mode (ATM).

Figure 1:
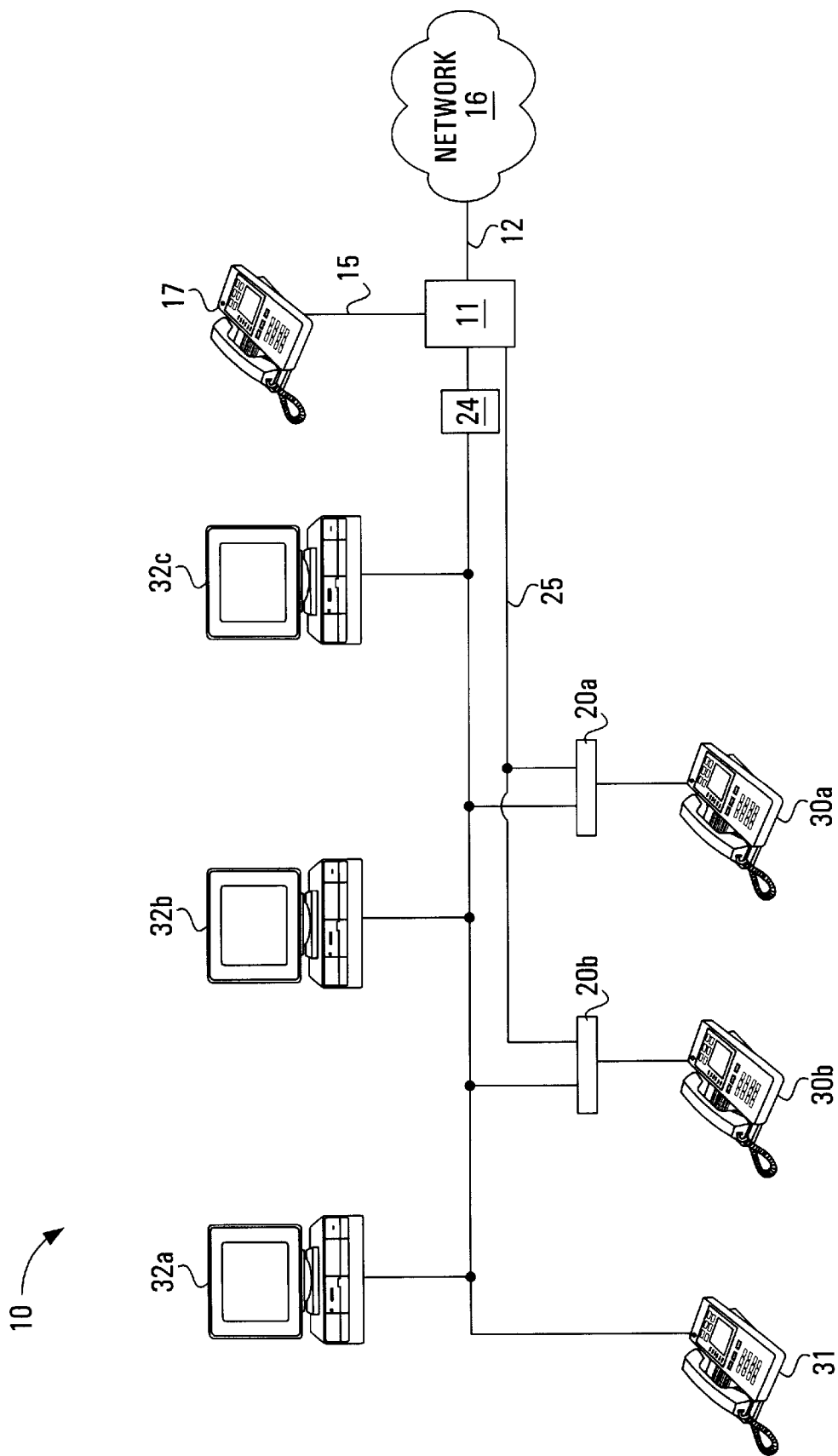
FIG. 1 is a schematic diagram of a home-based Local Area Network (LAN) with multiple telephone appliances, incorporating an embodiment of the invention, shown connected to a network.

Referring to FIG. 1, a home-based LAN 10 operating in conjunction with the ADSL standard comprises an Access Loop 12 connecting a POTS Splitter 11 to a network 16. The POTS splitter 11 outputs to an analog loop 15 and to POTS line 25. The POTS splitter 11 is also connected to the ADSL Transmission Unit—Receiver (ATU-R) 24. The ATU-R is in turn connected to the LAN backbone 26. Connected to the LAN backbone are computers 32a, 32b, 32c, a packet-based telephone 31 (which may be an Internet Protocol based telephone), and Terminal Adapters 20a, 20b. The Terminal Adapters 20a, 20b are connected between POTS line 25 and analog telephones 30a, 30b.

Figure 2:
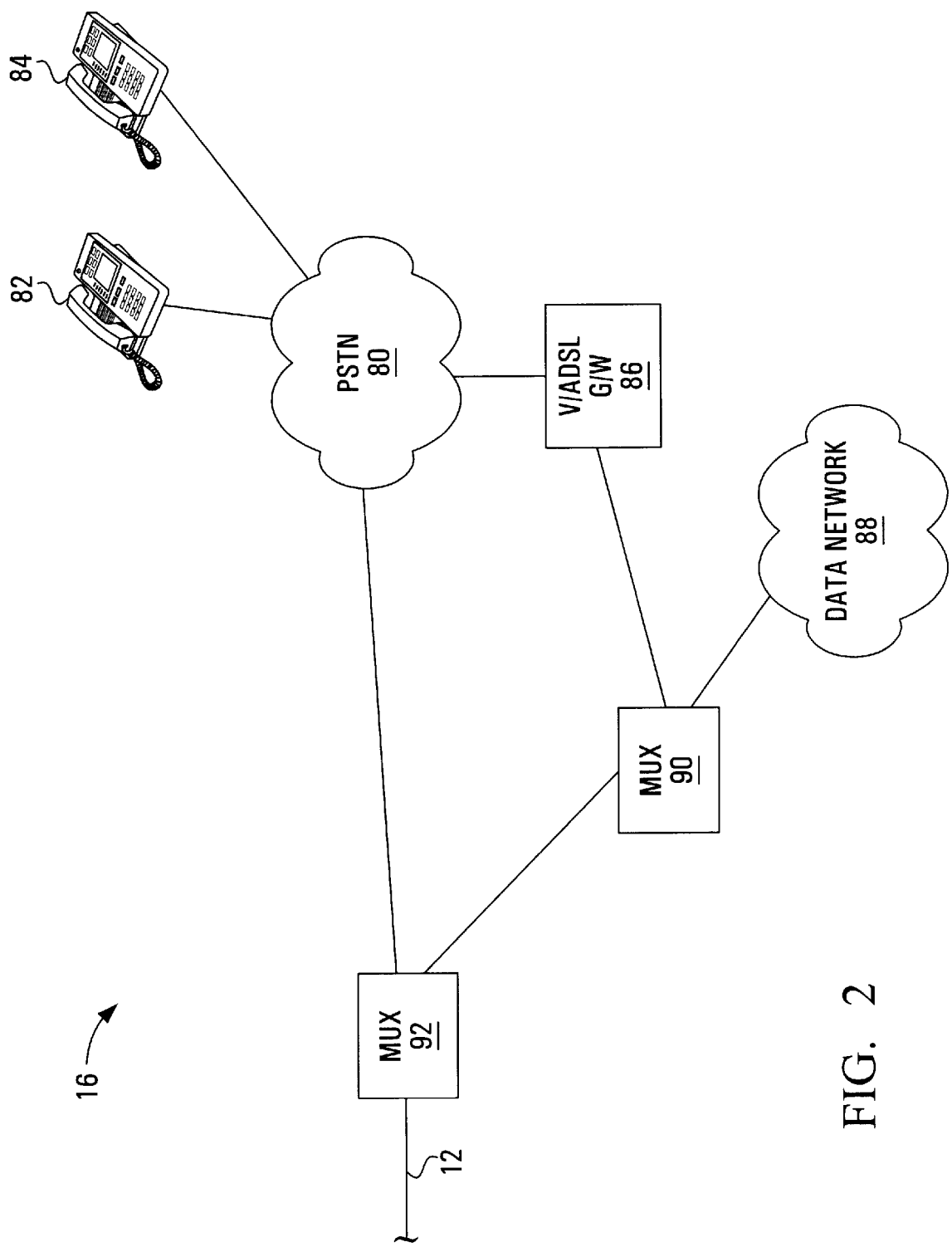
FIG. 2 is a schematic view detailing the network of FIG. 1, and FIG. 3 details, in a functional block diagram, a portion of FIG. 1.

As seen in FIG. 2, the network 16 comprises the public switched telephone network (PSTN) 80 to which a number of analog telephone appliances 82 and digital telephone appliances 84 are attached. The PSTN is connected to a voice over ADSL gateway 86. The gateway and a data network 88 are connected to a multiplexer (MUX) 90. Multiplexer 90 and the PSTN are connected to multiplexer (MUX) 92 which is, in turn, connected to access loop 12.

The ATU-R 24 acts as a bridge between the ADSL packet technology and the protocol under which the LAN operates, such as the commercially available ethernet protocol. Once translated from the ADSL protocol to the selected protocol, the data is transmitted to the home-based LAN backbone 26, which in FIG. 1 is configured as a bus topology.

To access data transmitted over the LAN backbone 26 with a POTS appliance 30a, 30b requires the use of a Terminal Adapter 20a, 20b interposed between the LAN backbone 26 and the analog appliance 30a, 30b. A Terminal Adapter is illustrated in FIG. 3.

Figure 3:
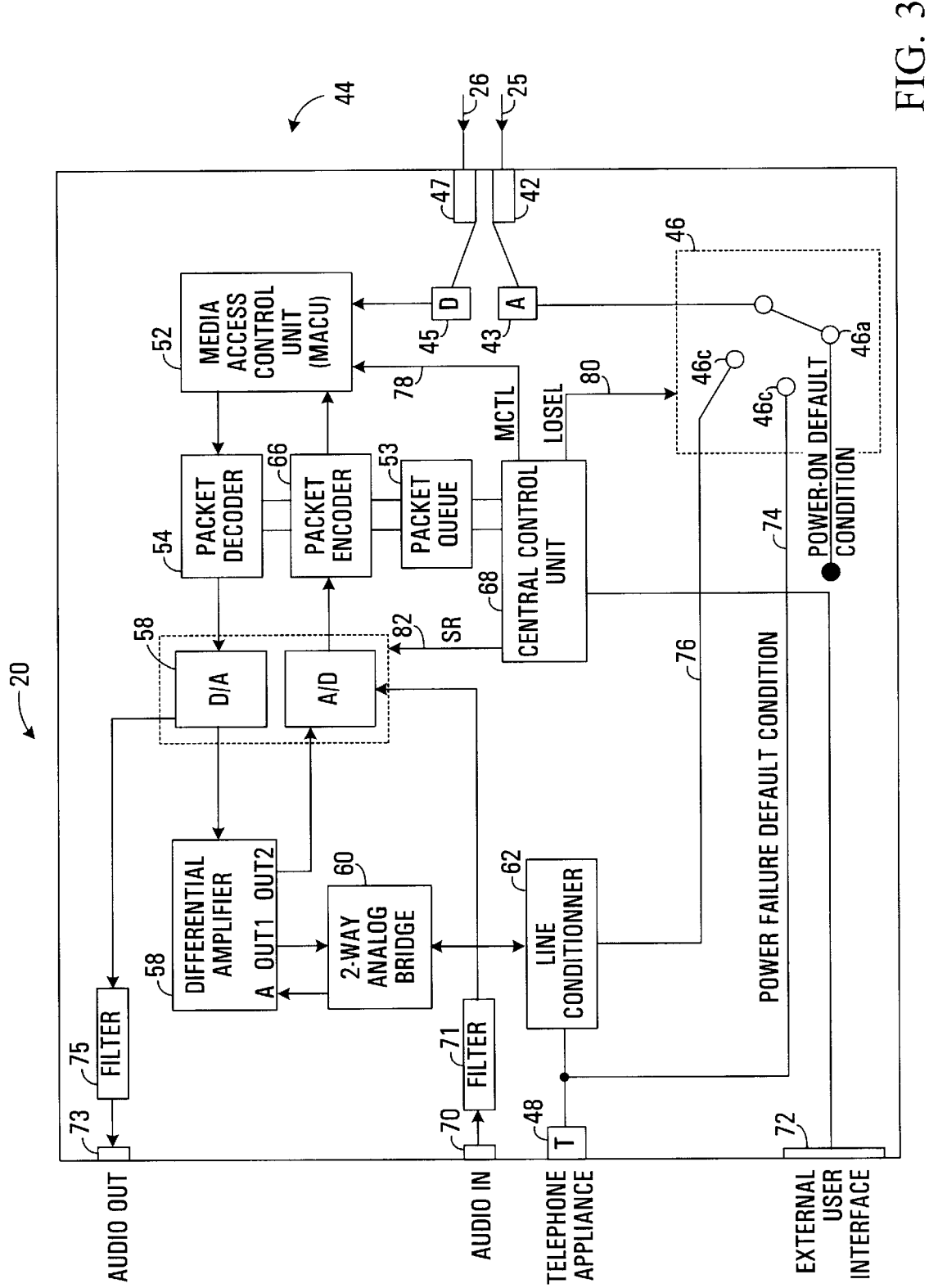

Referencing FIG. 3, a Terminal Adapter 20 consists of a jack 42 with an output 43 connected to a three-position switch 46 and a jack 47 with an output 45 connected to a Media Access Control Unit (MACU) 52. The MACU outputs to a Packet Decoder 54 and receives an input from a Packet Encoder 66. The Packet Encoder 66 is connected to both the Packet Decoder 54 and a Packet Queue 53. The Packet Encoder receives an input from an Analog to Digital (A/D) Converter 64 and the Packet Decoder outputs to this Converter. The Converter is connected for two-way communication with a Differential Amplifier 58, is input with an Audio Input jack 70 through filter 71 and outputs to an audio output jack 73 through filter 75. The Differential Amplifier is connected for two-way communication with a 2-Way Analog Bridge 60. The 2-Way Analog Bridge 60 is connected for two-way communication with a Line Conditioner 62. The Line Conditioner 62 is connected to a jack 48. Jack 48 is for connection to a POTS appliance. The three-position switch has an open-circuited terminal 46a, a POTS connection terminal 46b extending to jack 48 and a bridging terminal 46c extending to Line Conditioner 62.

A Central Control Unit (CCU) 68 outputs a control signal MCTL (MCAU Control) on line 78 to the MCAU, a control signal LOSEL (Line 0 Select) on line 80 to switch 46 and a control signal SR (Sampling Rate) on line 82 to Converter 56. The CCU is also connected to Packet Queue 53 and to an External User Interface jack 72.

The active components of the terminal adapter (namely the MACU, packet decoder and encoder, packet queue, CCU, Converter, differential amplifier, and line conditioner) are all powered by a power supply (not shown).

Referencing FIGS. 1 and 3, each Terminal Adapter 20 is connected to the LAN backbone 26 and the POTS line 25 through jacks 47, 42, respectively and to an Analog Telephone Appliance 30a, 30b through jack 48.

Referencing FIGS. 1 and 2, a call from an analog telephone appliance 82 to the home-based LAN 10 is switched through the PSTN to MUX 92 where the signal passes to line 12. Data packets (on a carrier wave) from the data network 88 addressed to a computer 32a, 32b, or 32c on the LAN pass to line 12 through MUX 90 and MUX 92. Data packets (on a carrier wave) from a digital telephone appliance 84 to a particular telephone appliance on the home-based LAN are switched through the PSTN to the voice over ADSL gateway 86. From the gateway, these packets pass to line 12 through MUX 90 and MUX 92.

Referencing FIGS. 1 and 3, when an incoming signal reaches POTS splitter 11, the Splitter, which is a passive frequency filter, separates the POTS frequency range (0 Khz–4 Khz) from the higher ADSL frequency range. The POTS frequencies are then transmitted to analog loop 15, to which one or more analog telephone appliances 17 (analog fax, telephone receiver/handset, etc.) is attached, and they are also transmitted to each Terminal Adapter 20a, 20b via POTS line 25. The ADSL frequencies are passed through the POTS Splitter 11 to the ATU-R 24.

A user of a given terminal adapter may request a setting for switch 46 of the adapter via the external user interface 72. Absent such a request, the CCU, while it is powered, maintains the switch 46 in its open circuited condition illustrated in FIG. 3 such that the POTS line 25 to the Terminal Adapter is open circuited and, hence, not usable. If the CCU senses an impending loss of power (e.g., if its supply voltage dips below a preset minimum), it sends a control pulse on line 80 causing the switch 46 to couple terminal 46b to the switch input. This establishes a path between the analog telephone appliance plugged into jack 48 and POTS line 25. In view of this, during power off conditions, the telephone appliance is connected to the POTS line whenever it is off-hook. This provides a "lifeline" for the telephone appliance when the digital componentry of the terminal adaptor is not functioning due to the power off condition.

Incoming digital packets on line 26 from the ATU-R 24 reach the MACU. During power on conditions, the CCU updates the MACU with the current address of the terminal adapter (on line 78). The MCAU stores this information and compares it with the destination address in the header of each incoming packet. If there is no match, the packet is discarded. On a match, the packet is temporarily stored in the Packet Queue 53 until the Packet Decoder 54 is free. The Packet Decoder 54 examines the header of the packet for certain parameters such as quality of service parameters (e.g., requested sampling rate; throughput) and the type of ring which should be applied. This information is then passed to the CCU. The CCU may wish to negotiate any of these parameters and, if so, requests the MACU to construct packets in reply. Based on the received, or negotiated, sampling rate, the CCU sends an appropriate signal to Digital to Analog Converter 64 to establish the sampling rate for the Converter. The data portion of the packet is then processed by the Converter 64, where the digital data is converted to an analog signal. The analog signal is then transmitted through Differential Amplifier 58. For incoming digital data packets, the Differential Amplifier 58 acts as an echo canceller to ensure the incoming signal is not reflected back to the far end. The incoming signal then passes through the 2-Way Analog Bridge 60 without modification and is conditioned in the Line Conditioner 62 and then transmitted to the telephone appliance via jack 48.

An outgoing signal transmitted by the user via the telephone appliance enters the line conditioner 62 via jack 48. The signal is conditioned and then passes through the 2-Way Analog Bridge 60 and Differential Amplifier 58 unmodified. The signal is converted to a digital signal by Analog to Digital Converter 64. The output from the Converter 64 is transmitted to Packet Encoder 66 where the appropriate packet headers for the protocol being used by the LAN 26 (FIG. 1) are added. The encoded packet is temporarily stored in the Packet Queue 53 until the MACU 52 is available. The MACU adds a source address to the header and transmits the packet over the LAN 26 via jack 47 at a time dependent upon a flow control parameter passed to the MACU by the CCU.

The CCU may dynamically request a change in any parameters for the call at any time by causing appropriate information to be added to the headers of outgoing packets. Similarly, the headers of incoming packets for the call may request a change in parameters. For example, if the number of calls multiplexed on the ADSL line to the LAN increase, a terminal adapter for an ongoing call may dynamically accept a lower quality of service to accommodate the increased load.

All of the operations of the Terminal Adapter 20 are coordinated and controlled by the Central Control Unit (CCU) 68 during power on conditions. When a power off conditioned is encountered, as aforenoted, the CCU 68 switch switch 46 to terminal 46b.

A user of a telephone appliance connected to jack 48 may utilise POTS line 25 during a power on condition by sending a request through the external user interface 72. This causes the CCU 68 to switch the switch 46 to its terminal 46b. The user may also request that the POTS line 25 be bridged with a data call by an appropriate request through the user interface. This causes the CCU to switch the switch 46 to its terminal 46c. In the result, the POTS line is connected to the line conditioner 62 and 2-Way Analog Bridge. When this occurs, the bridge connects the POTS signal to the analog signal derived from line 26 and connects both to jack 48 so that the telephone appliance plugged into jack 48 is conferenced into the call.

The Audio Input jack 70 allows a user to transmit audio signals from a secondary source (such as a CD-Player or radio) over the LAN 26 by connecting the audio signal source to the Audio Input jack 70. The audio signal is processed in the same manner as the signal received by the Terminal Adapter 20 from a telephone appliance plugged into jack 48. The audio output jack 73 allows a user to couple received audio to a stereo system. Filters 71, 75 are merely to remove sampling artefacts.

The packet-based telephone 31 may be used in placed of an analog appliance 30a, 30b. The packet-based Telephone does not require the use of a Terminal Adapter 20a, 20b, but rather connects directly to the LAN backbone 26 by incorporating into its circuitry the capabilities of the Terminal Adapter. The packet-based Telephone does not offer any POTS service during a power off condition.

While the LAN of FIG. 1 has a bus topology, it could equally be implemented with any other topology such as a star or ring topology. With the LAN implemented as a star topology, the ATU-R, in addition to acting as a bridge between the ADSL packet technology and the LAN protocol, acts as a switch directing the data packets to the particular terminal adapter, packet-based telephone or computer for which the packet was addressed. This embodiment reduces the processing requirements of the Terminal Adapters and centralizes some processing in the ATU-R.

In an alternate embodiment, POTS splitter 11 may be eliminated and a splitter incorporated at each terminal adapter 20. In such case, no signal is passed to an analog loop 15.

The differential amplifier, 2-way analog bridge and filters may be implemented digitally.

A feature of this invention is the ease in which a new telephone line may be added to a premises. Adding a new telephone line involves simply connecting a Terminal Adapter, with a unique address, to the LAN. A newly connected Terminal Adapter sends a request to the CO informing the CO of the Terminal Adapter's address. An acknowledgement of this request is returned to the Terminal Adapter. The user of this new Terminal Adapter would then be able to send and receive telephone calls by connecting an analog telephone to the Terminal Adapter. A similar result can be obtained by connecting a packet-based telephone directly to the LAN.

A feature of the invention is the ability to perform a variety of functions with an analog telephone, including but not limited to, call forwarding, conference calls (with both internal and external telephone subscribers) and telephone intercom. These features are accomplished by directing the terminal adapter to respond to several different packets addresses, or by sending the same packet to multiple addresses.

A further feature of the invention is that the CCU could indicate to the user when the bandwidth necessary for full duplex conversation is not available on either the LAN or the connection to the CO via the ADSL standard.

What is claimed is:

1. A method for adding a telephone line to an existing premise using a digital transmission medium and using an analog telephone handset, comprising:

upon connection of a terminal adapter to said digital transmission medium, transmitting a digital request from said terminal adapter to a central office with an address of said terminal adapter;

receiving at said terminal adapter an acknowledgement message from said central office responsive to said digital request confirming provisioning of a new telephone line at said premise;

at said terminal adapter, after receipt of said acknowledgement message, determining whether said digital signals received from said central office are destined for said terminal adapter;

if said digital signals are destined for said terminal adapter, translating said digital signals to analog signals at said terminal adapter;

at said terminal adapter transmitting said analog signals to an analog telephone handset in communication with said terminal adapter.

2. The method of claim 1 further comprising, translating analog signals received by said terminal adapter from said telephone handset to digital signals and transmitting said digital signals translated from analog signals to said central office.

3. The method of claim 2 wherein said terminal adapter is also connected to an analog transmission medium and further comprising;

at said terminal adapters switching to receive analog signals from said analog transmission medium when said digital transmission medium fails; and at said terminal adapter, transmitting said received analog signals to said analog telephone handset.

4. A terminal adapter for connecting an analog telephone handset to a digital transmission medium and for assisting in creating a new telephone line, comprising:

a first input/output port for connection to said digital transmission medium;

a second input/output port for connection to said telephone handset;

control means in communication with said first and second input/output ports, said control means for:
  transmitting, over said first input/output port a request for a new telephone line;
  receiving a message at said first input/output port responsive to said request; and
  thereafter identifying digital signals received at said first input/output port which are destined for said second input/output port; and a translator in communication with said second input/output port and with said control means for upon connection of a terminal adapter to said digital transmission medium, translating said identified digital signals to analog signals and transmitting said analog signals to said second input/output port.

5. The terminal adapter of claim 4, wherein said first input/output port is additionally for connection to an analog transmission medium and further comprising:

a switch adapted to select and receive transmissions from one of said digital and analog transmission media.

6. The terminal adapter of claim 5, wherein said switch is adapted to select said analog transmission medium when said digital transmission medium has failed.

7. The terminal adapter of claim 6 wherein said digital signals are digital data packets with a header for identifying said terminal adapter.

8. The terminal adapter of claim 7 wherein said translator is adapted to convert analog signals received from said second input/output port to digital signals and transmit said digital signals toward said first input/output port for transmission on said digital medium.

9. The terminal adapter of claim 8, wherein digital signals transmitted by said terminal adapter are digital data packets.

10. The terminal adapter of 9 wherein said control means comprises:

a media control unit adapted to determine from the headers of said digital data packets received at said first input/output port if said digital data packets are destined for said second input/output port;

a packet decoder to decode said digital data packets destined for said second input/output port;

a packet encoder coupled to an output of said translator to packetise digital signals received from said translator;

said media control unit further adapted to transmit digital data packets to said first input/output port after encoding by said packet encoder;

a packet queue to temporarily store digital data packets; and a central processing unit in communication with, and coordinating the operations of, said media control unit, said packet decoder, said packet encoder and said packet queue.

11. The terminal adapter of claim 10 wherein said packet decoder examines a header of each said digital data packets destined for said second input/output port for characteristics of a transmission encoded in said digital data packets and passes said characteristics to said central processing unit.

12. The terminal adapter of claim 11 wherein said characteristics include quality of service data.

* * * * *

UNITED STATES PATENT AND TRADEMARK OFFICE
CERTIFICATE OF CORRECTION

PATENT NO.    : 6,130,893
DATED         : October 10, 2000
INVENTOR(S)   : Richard Jonathan Whittaker et al.

It is certified that error appears in the above-identified patent and that said Letters Patent is hereby corrected as shown below:

On the Title page, Field [75], replace "Jim" with --James R.--.

In the summary of Invention, Column 1, following line 37, and just prior to Column 2, line 38, delete the text commencing "Another aspect of the invention is A method for voice multiplexing a two wire telephone line..." and ending "...when the digital transmission medium has failed.", and insert the following:

-- In another aspect of the invention, there is provided a method for voice multiplexing a two wire telephone line, comprising: sending packetised data to a two wire telephone line, with packets representing a plurality of voice channels; sending plain old telephone service (POTS) frequencies along with said packetised data; for each packet of packetised data, determining a destination analog telephone from amongst a plurality of analog telephone appliances on said two wire telephone line based on address information of said each packet; converting data to an analog signal and passing said analog signal to said destination analog telephone; and whenever power is lost for the steps of determining a destination analog telephone appliance and converting data to an analog signal, filtering said POTS frequencies out at said two wire telephone line and passing a POTS signal comprising said POTS frequencies to each analog telephone appliance on said two wire telephone line.

In another aspect of the present invention, there is provided an apparatus for voice multiplexing a two wire telephone line, comprising: a supply powered decoder and digital to analog converter normally connecting a non-POTS line and a POTS port for connection to an analog telephone appliance; a switch connecting a POTS line to said POTS port on a supply power off condition; and one or more filters for passing frequencies of incoming signals on said two wire telephone line associated with POTS to said POTS line and frequencies of said incoming signals not associated with POTS to said non-POTS line.

In a still further aspect of the present invention there is provided a method for adding a telephone line to an existing premise using a digital transmission medium and using an analog telephone hanset, comprising: upon connection of a terminal adapter to

UNITED STATES PATENT AND TRADEMARK OFFICE
CERTIFICATE OF CORRECTION

PATENT NO.   : 6,130,893
DATED        : October 10, 2000
INVENTOR(S)  : Richard Jonathan Whittaker et al.

It is certified that error appears in the above-identified patent and that said Letters Patent is hereby corrected as shown below:

said digital transmission medium, transmitting a digital request from said terminal adapter to a central office with an address of said terminal adapter; receiving at said terminal adapter an acknowledgement message from said central officee responsive to said digital request confirming provisioning of a new telephone line at said premise; at said terminal adapter, after receipt of said acknowledgement message, determining whether said digitals signals received from said central office are destned for said terminal adapter; if said digital signals are destned for said terminal adapter, translating said digital signals to analog signals at said terminal adapter; at said terminal adapter transmitting said analog to an analog telephone hanset in communication with said adapter.

In a still further aspect of the present invention, there is provided a terminal adapter for connecting an analog telephone hanset to a digital transmission medium and for assisting in creating a new telephone line, comprising: a first input/output port for connection to said digital transmission medium; a second input/output for connection to said telephone hanset; control means in communication with said first and second input/output ports, said control means for: upon connection of a terminal adapter to said digital transmission medium, transmitting, over said first input/output port responsive to said request; thereafter identifying digital signals received at said first input/ouput port which are destned for said second input/output port; and a translator in communication with said second input/output port and with said control means for translating said identified digital signals to analog signals and transmitting said analog signals to said second input/output port.--

Column 6,
Line 64, replace "comprising;" with --comprising:--
Line 65, replace "adapters" with --adapter,--

UNITED STATES PATENT AND TRADEMARK OFFICE
CERTIFICATE OF CORRECTION

PATENT NO. : 6,130,893
DATED : October 10, 2000
INVENTOR(S) : Richard Jonathan Whittaker et al.

It is certified that error appears in the above-identified patent and that said Letters Patent is hereby corrected as shown below:

Column 7,
Lines 11-12, replace "said control means for: transmitting," with --said control means for: upon connection of a terminal adapter to said digital transmission medium, transmitting,--
Line 15, replace "request; and" with --request;--
Lines 20-22, replace "said control means for upon connection of a terminal adapter to said digital transmission medium, translating" with --said control means for translating--

Column 8,
Line 25, replace "coordnating" with --co-ordinating--

Signed and Sealed this

Twenty-sixth Day of June, 2001

*Attest:*

*Attesting Officer*

NICHOLAS P. GODICI
*Acting Director of the United States Patent and Trademark Office*